United States Patent
Hindy et al.

(10) Patent No.: US 11,664,862 B2
(45) Date of Patent: *May 30, 2023

(54) METHOD AND APPARATUS FOR TRANSMITTING AN INDICATOR OF PRECODER COEFFICIENTS

(71) Applicant: Lenovo (Singapore) Pte. Ltd., New Tech Park (SG)

(72) Inventors: Ahmed Hindy, Forest Park, IL (US); Udar Mittal, Rolling Meadows, IL (US); Tyler Brown, Lake Zurich, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,454

(22) Filed: Dec. 5, 2021

(65) Prior Publication Data
US 2022/0094405 A1    Mar. 24, 2022

Related U.S. Application Data

(63) Continuation of application No. 16/870,804, filed on May 8, 2020, now Pat. No. 11,223,400.
(Continued)

(51) Int. Cl.
*H04B 7/06* (2006.01)
*H04B 7/08* (2006.01)
(Continued)

(52) U.S. Cl.
CPC ......... *H04B 7/0478* (2013.01); *H04B 7/0408* (2013.01); *H04B 7/0617* (2013.01);
(Continued)

(58) Field of Classification Search
CPC .. H04B 7/0478; H04B 7/0408; H04B 7/0617; H04B 7/0626; H04B 7/0639; H04B 7/084
See application file for complete search history.

(56) References Cited

U.S. PATENT DOCUMENTS 11,223,400 B2 *   1/2022   Hindy ............... H04B 7/0465
2013/0279437 A1  10/2013   Ng et al.
(Continued)

OTHER PUBLICATIONS

Daya, Notice of References cited, PTO-892, U.S. Appl. No. 16/870,850, U.S. Patent and Trademark Office, dated May 24, 2022.
(Continued)

*Primary Examiner* — Jaison Joseph
(74) *Attorney, Agent, or Firm* — Loppnow & Chapa; Matthew C. Loppnow (57) ABSTRACT

A CBSR configuration can include a set of restricted beams. Each restricted beam can be constrained by a configured maximum allowed gain value. A set of beams including one or more restricted beams can be selected. A set of precoder coefficients can be determined for each selected beam. A function of the set of precoder coefficients can satisfy the configured maximum allowed gain value. The function can be proportional to a square root of an average of squared values of amplitudes of members of the subset. A CSI report can be transmitted. The CSI report can include at least an indicator of the set of selected beams and an indicator of the set of precoder coefficients corresponding to each selected beam.

9 Claims, 6 Drawing Sheets

Related U.S. Application Data

(60) Provisional application No. 62/846,527, filed on May 10, 2019.

(51) Int. Cl.
  *H04B 7/0456* (2017.01)
  *H04B 7/0408* (2017.01)

(52) U.S. Cl.
  CPC ......... *H04B 7/0626* (2013.01); *H04B 7/0639* (2013.01); *H04B 7/084* (2013.01)

(56) References Cited

U.S. PATENT DOCUMENTS

| | | |
|---|---|---|
| 2016/0142117 A1 | 5/2016 | Rahman et al. |
| 2018/0083676 A1 | 3/2018 | Wei et al. |
| 2018/0212653 A1 | 7/2018 | Miao et al. |
| 2019/0068267 A1* | 2/2019 | Rahman ............... H04B 7/0626 |
| 2020/0145071 A1 | 5/2020 | Brown et al. |
| 2020/0186207 A1* | 6/2020 | Davydov ............. H04B 7/0426 |
| 2020/0295813 A1* | 9/2020 | Rahman ............... H04B 7/0478 |
| 2020/0358495 A1 | 11/2020 | Hindy et al. |
| 2021/0159953 A1* | 5/2021 | Wu ...................... H04B 7/0658 |
| 2022/0029685 A1 | 1/2022 | Li et al. |

OTHER PUBLICATIONS

Daya, Notice of References cited, PTO-892, U.S. Appl. No. 16/870,850 U.S. Patent and Trademark Office, Feb. 15, 2022.

* cited by examiner

METHOD AND APPARATUS FOR TRANSMITTING AN INDICATOR OF PRECODER COEFFICIENTS

BACKGROUND

1. Field

The present disclosure is directed to a method and apparatus for transmitting precoding coefficients. More particularly, the present disclosure is directed to transmitting precoding coefficients on a wireless wide area network.

2. Introduction

Presently, wireless communication devices, such as User Equipment (UE), communicate with other communication devices using wireless signals. It has been agreed at Radio Access Network1 (RAN1) meeting #95 that for Release-16 (Rel-16) New Radio (NR), Alt1 (DFT-based compression) in Table 1 of R1-1813002 will be the adopted Type II rank 1-2 overhead reduction (compression) scheme as formulated in Alt1.1 of R1-1813002. The same DFT-based compression scheme is extended for Type II port selection codebook. Codebook Subset Restriction (CBSR) is supported when DFT-based compression is utilized for Type II codebooks with overhead reduction (compression) scheme. A detailed signaling mechanism was yet to be considered. Also, additional compression scheme(s) were not precluded.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide for codebook subset restriction for Type-2 Discrete Fourier Transform (DFT) Codebook. At least some embodiments can provide for a CBSR where the CBSR for the DFT codebook is specified similar to Rel. 15 CBSR.

According to a possible embodiment, a CBSR configuration can be received from a network. The network can include a Transmit-Receive Point (TRP). The CBSR configuration can include a set of restricted beams. Each restricted beam in the set of restricted beams can be constrained by a maximum allowed gain. Maximum allowed gain can be a value reported by the network for each restricted beam. Reference signals transmitted by the TRP can be received. A set of beams can be selected based on at least the received reference signals. The set of selected beams can include one or more restricted beams from the set of restricted beams. A set of precoder coefficients can be determined for each beam of the set of selected beams. Each set of precoder coefficients corresponding to a selected restricted beam can form a beam gain. A function of the set of precoder coefficients can satisfy the maximum allowed gain constraint. The function of the set of precoder coefficients can be proportional to an average of amplitudes of members of a subset of the set of precoder coefficients or a square root of an average of squared values of amplitudes of members of the subset of the set of precoder coefficients. A CSI report can be transmitted to the network. The CSI report can include at least an indicator of the set of selected beams and an indicator of the set of precoding coefficients corresponding to each selected restricted beam. The CSI report can also include coefficients of the selected beams, whether they are restricted or not.

According to a possible embodiment, CBSR configuration can be received from network including a TRP. The CBSR configuration can include a set of restricted beams. Each restricted beam of the set of restricted beams can be associated with a restricted beam gain coefficient. A plurality of sets of quantized coefficients can be determined based on the CBSR configuration. A set of quantized coefficients corresponding to a particular restricted beam can generate a set of quantized weights at a set of frequencies based on a least a Fourier transform of the set of quantized coefficients of the particular restricted beam. The set of quantized coefficients can be in the plurality of sets of quantized coefficients. The plurality of sets of quantized coefficients can be determined such that quantized weights of the particular restricted beam satisfy a constraint based on at least the set of quantized coefficients corresponding to the particular restricted beam and the restricted beam gain coefficient. A CSI report can be transmitted to the network. The CSI report can include the plurality of sets of quantized coefficients.

Figure 1:
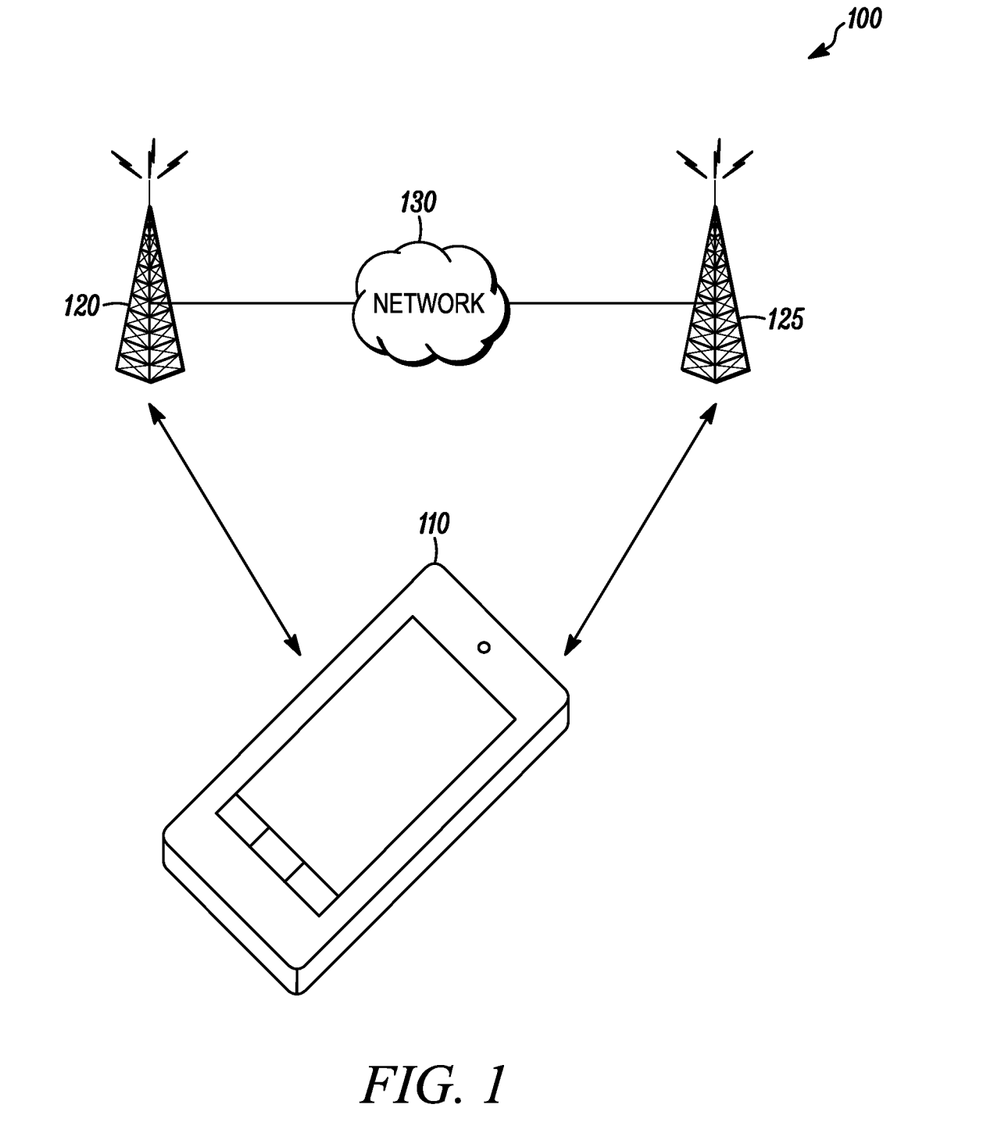
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

Similar to Long Term Evolution (LTE), CBSR can be supported for NR Rel. 15 Type-I and Type-II Channel State Information (CSI) for controlling inter-cell interference levels. In Type-I CBSR, a size $N_1 N_2 O_1 O_2$ bitmap can be used to indicate the restricted beam, where $N_1/N_2$ and $O_1/O_2$ can indicate the number of horizontal/vertical ports and horizontal/vertical oversampling factors, respectively. Each bit in the sequence can be used to restrict a certain DFT beam for a given oversampling index.

In Type-II CBSR, instead of a hard restriction decision, i.e., a DFT beam within an oversampling index is either fully prohibited or unrestrictedly available, an amplitude restriction can be further imposed as follows. First, the $N_1 N_2 O_1 O_2$ virtual DFT beams ($N_1 N_2$ DFT beams, each with $O_1 O_2$ different oversampling indices) can be re-grouped into $O_1 O_2$ beam groups (beams within a beam group may not necessarily belong to the same oversampling index). Second, beam restriction may only be allowed on 4 out of the $N_1 N_2 O_1 O_2$ beam groups. $\lceil \log_2 C_4^{O_1 O_2} \rceil$ bits can be used to indicate the restricted beam groups. Third, for the $4 N_1 N_2$ beams over the 4 beam groups, 2 bits can be used for each beam to indicate the maximum amplitude allowed $$\left( Amp. = \left\{ 1, \left(\frac{1}{2}\right)^{\frac{1}{2}}, \left(\frac{1}{4}\right)^{\frac{1}{2}}, 0 \right\} \right),$$

i.e., −3 dB step size, for that beam. Hence, $8 N_1 N_2$ bits can be required to report the amplitude restrictions for the 4 restricted beam groups.

Also, the reported precoder coefficients can be quantized as follows. First, reference amplitude for weaker polarization can take on values $$\left\{ 1, \left(\frac{1}{2}\right)^{\frac{1}{4}}, \left(\frac{1}{4}\right)^{\frac{1}{4}}, \ldots, \left(\frac{1}{2^{14}}\right)^{\frac{1}{4}} \right\},$$

i.e., −1.5 dB step size. Second, coefficient amplitudes can take on values $$\left\{ 1, \left(\frac{1}{2}\right)^{\frac{1}{2}}, \left(\frac{1}{4}\right)^{\frac{1}{2}}, \ldots, \left(\frac{1}{2^7}\right)^{\frac{1}{2}} \right\},$$

i.e., −3 dB step size.

Within the restricted beam groups, dealing with unrestricted beams (beams with unit amplitude) and fully restricted beams (beams with zero amplitude) can be trivial, since the beam can then be fully utilized/abandoned when designing the precoder. However, dealing with partially restricted beams (beams with positive amplitude less than unity) may be non-trivial.

At least some embodiments can address a case in which one partially restricted beam is included in the precoder, e.g., its amplitude is restricted to x dB, x={−3,−6} dB. Furthermore, a beam can be dubbed dominant beam if the amplitude of at least one of its tap coefficients is 0 dB (unit value).

According to a possible embodiment, the restricted beam can be abandoned. This can be used if the beam is fully restricted.

According to a possible embodiment, tap coefficient amplitudes of restricted beam can be shifted by x dB regardless of their values. This can be used if the restricted beam is a dominant beam at both polarizations and both polarization amplitudes are 0 dB.

A possible embodiment can be based on max tap coefficient amplitude of restricted beam for polarization j being $y_j$, where $y_j=\{0,-3,-6, \ldots \}$ dB. If $y_j \leq x$, Sub-Band (SB) amplitudes of restricted beam at polarization j can be kept as is. If $y_j > x$, all SB amplitudes in the restricted beam at polarization j can be shifted by $0, x-y_j$ dB. In general, the SB amplitude of restricted beam at pol. j can be shifted by $\min(0, x-y_j)$ dB. This can be used if both polarization amplitudes are one.

A possible embodiment can be based on polarization amplitude for polarization j being $z_j$, where $z_j=\{0,-1.5,-3,-4.5,-6 \ldots \}$ dB. If $z_j \leq x$, SB amplitudes of restricted beam at polarization j can be kept as is. If $z_j > x$, all SB amplitudes in the restricted beam at polarization j can be shifted by $x-z'_j$ dB, where $z'_j$ can be the smallest value in 3 dB step size that satisfies $z'_j \geq z_j$. For example, if $z_j$ is −4.5 dB, then $z'_j=-3$ dB, and if $z_j$ is −3 dB then $z'_j=z_j=-3$ dB, i.e., $z'_j$ is in form −3k dB with k integer. In general, SB amplitude of restricted beam at polarization j can be shifted by $\min(0, x-z_j)$ dB. This can be used if restricted beam is a dominant beam at both polarizations.

According to a possible embodiment, if $z_j+y_j \leq x$ dB, SB amplitude coefficients at polarization j can be kept as is (no need for restriction). If $z_j+y_j > x$, an upper bound z' can be created for z, where z' can be the smallest value in form of −3k dB (where k is an integer) such that $z'_j \geq z_j$, e.g., if weaker polarization amplitude is −4.5 dB then $z'_j=-3$ dB. SB amplitudes for restricted beam in weaker polarization can be shifted by $x-z'_j-y_j$ dB. In general, SB amplitude of restricted beam at polarization j can be shifted by $\min(0, x-z'_j-y_j)$ dB. This can be used for a general case.

According to a possible embodiment, Rel. 15 Type-II CBSR framework can be reused.

According to a possible embodiment, CBSR check can be done in one or more stages. According to a first stage, such as Stage-1, a frequency domain CBSR check can be performed before Inverse Fast Fourier Transform (IFFT). This can be easy to implement. This may not take into account the dropped taps/coefficients nor quantization values. A second stage, such as Stage-2, can be in the tap domain. This can be easy to implement. Also, in this stage, coefficient phases could be aligned in a way that makes the beam CBSR compliant in tap domain but not in the frequency domain. According to a third stage, such as Stage-3, a frequency domain CBSR check can be performed after Fast Fourier Transform (FFT) of quantized values (same stage in which CQI values are computed). This can provide a reliable CBSR check. Also, this can be more complex since quantization values can be readjusted.

In Rel. 15 CBSR if the restricted beam turns out to be the dominant beam, the UE may have to readjust the beam ordering so that the restricted beam is not the dominant beam.

If attenuation due to CBSR enforcement would lead a coefficient to fall below the minimum quantized amplitude value, this amplitude can be approximated to zero (coefficient discarded) or kept as is (without reduction).

Figure 2:
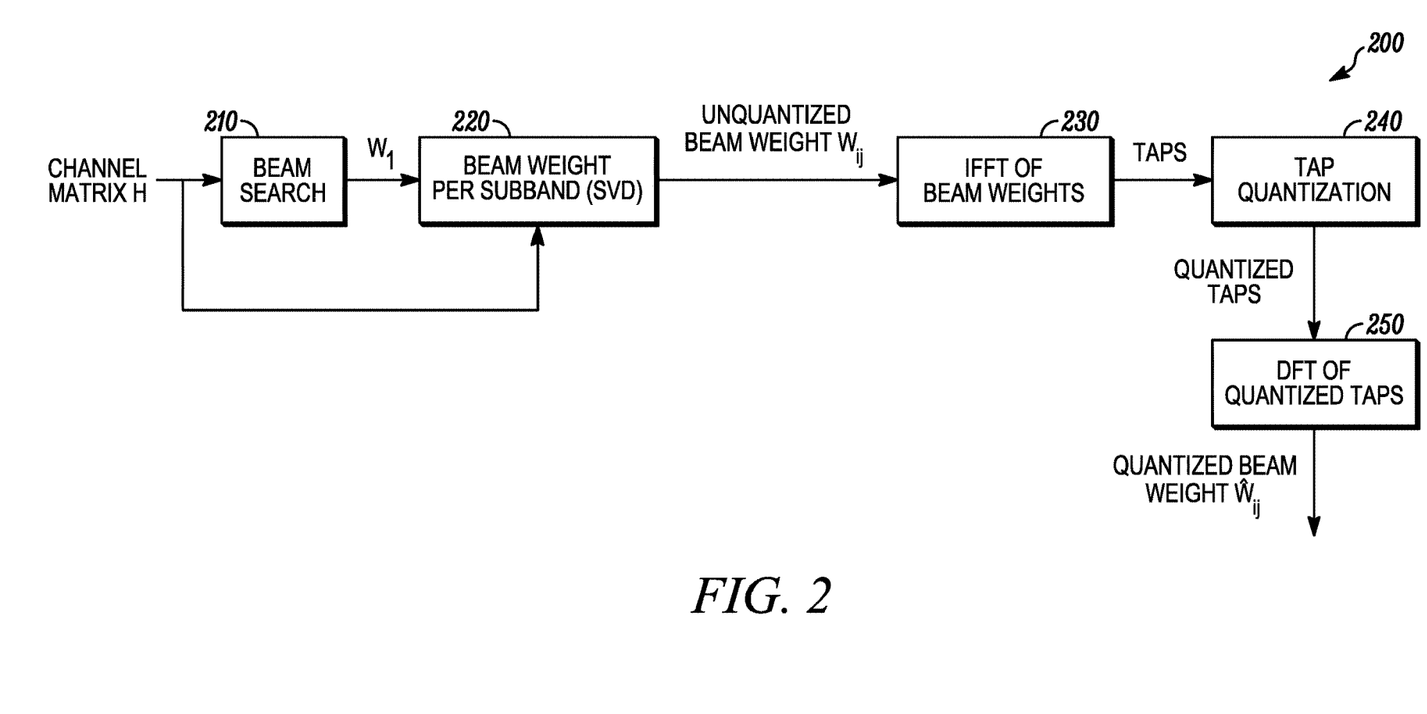
FIG. 2 is an example illustration of a block diagram of Rel. 16 Type-2 compression without CBSR according to a possible embodiment.

FIG. 2 is an example illustration 200 of a block diagram of Rel. 16 Type-2 compression without CBSR according to a possible embodiment. At 210, a channel matrix H can be received and a beam search can be performed resulting in beam $w_1$. At 220, beam weights per subbrand using Singular-Value Decomposition (SVD) can be obtained from $w_1$ resulting in unquantized beam weights $w_{ji}$. At 230, IFFT can be performed on the beam weights and taps can be output. At 240, tap quantization can be performed on the taps resulting in quantized taps. At 250, DFT of the quantized taps can be performed resulting in quantized beam weights $\hat{w}_{ij}$.

For example, a method can be used for of handling CBSR under Stage-3 CBSR check. Under Stage-3 CBSR check, CBSR can be further defined to be such that for each subband, the precoder's weight corresponding to a restricted beam should be less than the product of a predefined restricted gain $g_r<1$, and the precoder's weight corresponding to another beam (non-restricted) at the same subband obtained in the beam search. In an example case a precoding vector can be formed by a linear combination of 2L beams: $v_1, v_2, \ldots, v_{2L}$. As known in the art, the codebook compresses the spatial directions of the channel into 2L directions, which are referred to as beams. Without loss of generality, it can be assumed that k<2L of the beams are from the restricted set and the restricted beams are $v_{2L-k+1}, \ldots, v_{2L}$. The weights for the $i^{th}$ subband and $j^{th}$ beam can be given by either $w_{ij}$ (unquantized) or $\hat{w}_{ij}$ (quantized).

To elaborate according to a first observation, because of linearity property of DFT and the quantization levels of the subband coefficients quantization levels are equally spaced (in dB), it is possible to simultaneously scale down coefficients and beam weights without needing an extra DFT. Decrease the subband quantization levels of all taps/coefficients of the restricted beam can be decreased by a certain level(s) in case it violates CBSR. Correspondingly, all the weights can be scaled by a certain dB. The bitmap of corresponding to a restricted beam tap can be reset if its quantization level cannot be decreased further.

CBSR can be defined to be such that for each subband the precoder's weight corresponding to a restricted beam should be less than the product of a predefined restricted gain $g_r<1$, and the precoder's weight corresponding to another beam (non-restricted) at the same subband can be obtained in the beam search. In an example case, a precoding vector can be formed by a linear combination of 2L beams: $v_1, v_2, \ldots, v_{2L}$. Without loss of generality, it can be assumed that k<2L of the beams are from the restricted set and the restricted beams are: $v_{2L-k+1}, \ldots, v_{2L}$. The weights for the $i^{th}$ subband and $j^{th}$ beam can be given by either $w_{ij}$ (unquantized) or $\hat{w}_{ij}$ (quantized).

Let $p_i$ be a precoding vector for subband and is given by:

$$p_i = \Sigma_{j=1}^{2L} w_{ij} v_j \quad (1)$$

or $$p_i = \Sigma_{j=1}^{2L} \hat{w}_{ij} v_j \quad (2)$$

where $v_j$ can represent the Spatial Dimension (SD) beam and $w_{ij}$ can correspond to the weight allocated for $i^{th}$ subband and $j^{th}$ beam. For CBSR, with respect to Equation (1) for all subbands and for all j>2L−k, there can exist a beam m(i) ≤2L−k, $w_{ij} \leq g_r w_{im(i)}$. This CBSR approach can be referred to as per subband max gain restriction.

For a second approach with respect to Equation (2), the CBSR can be defined in wideband. For this approach, the max normalized wideband gain of the restricted beams may not be more than a restricted gain (gr) times the max normalized wideband gain of other non-restricted beams. The normalized wideband gain of a beam can be defined as the maximum normalized subband gain of a beam over all the subbands.

The normalized subband gain (for subband i) for a beam j ($\hat{w}_{ij}$) can be given by:

$$\hat{w}_{ij} = \frac{w_{ij}}{\|p_i\|}. \quad (3)$$

The presence of the subband dependent normalization factor $\|p_i\|$ (which is the magnitude of the precoding vector for subband i) in Equation (3) can make the subsequent definition of wideband gain in Equation (4) below different from that of Rel. 15. However, unlike Rel. 15, where the dynamic range of the values of normalizing factor is small, here the dynamic range can be very large (because the norm depends on magnitude and phase of various taps). Thus, different normalization can be used. However, even though theoretically dynamic range can be large, there can be a small dynamic range and hence the normalization in (3) can be ignored.

The wideband gain for beam j can be now defined as maximum of normalized subband beam gains over all subbands:

$$w_j = \max_i \hat{w}_{ij} \quad (4)$$

Thus, for CBSR in the wideband, for all j>2L−k, there can exist a beam m≤2L−k, $w_j \leq g_r w_m$. This can be referred to as a wideband CBSR.

Figure 3:
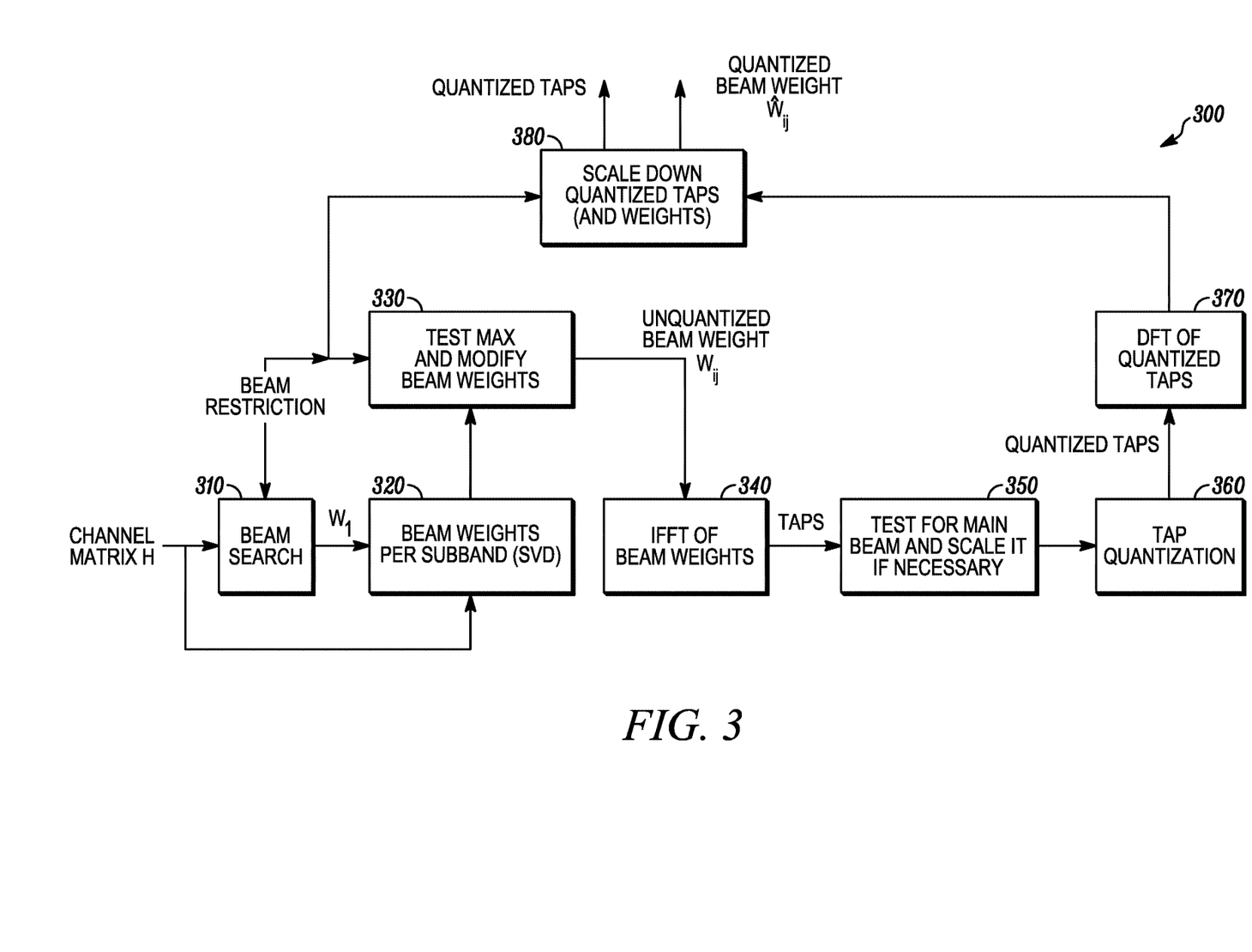
FIG. 3 is an example illustration of a block diagram of Rel.16 Type-2 compression with CBSR according to a possible embodiment.

FIG. 3 is an example illustration 300 of a block diagram of Rel.16 Type-2 compression with CBSR according to a possible embodiment. At 310, a beam search can be performed on channel matrix H using a beam restriction resulting in $w_1$. At 320, beam weights per subbrand (SVD) can be obtained from $w_1$.

At 330, a test max and modify operation can be performed. For example, a similar step to scaling down quantized taps and weights that will be later described with respect to block 380 can be performed, but on unquantized beam weights instead of the quantized beam weights. Since there is no need of compensation of the time domain taps, the process may not be limited by scaling all the taps or weights. Certain unquantized beam weights that are resulting in CBSR violation can be selectively modified. Now the violation test in equation (5) for max subband gain CBSR violation can become $$q_{ij} = 20\log_{10}\left(\max_m\left(\frac{\alpha g_r w_{im}}{w_{ij}}\right)\right), 1 \leq m \leq 2L - k, i \in s_j \quad (8)$$

and equation (6) becomes for normalized wideband gain CBSR violation can become $$q_{ij} = 20\log_{10}\left(\max_m\left(\frac{\alpha g_r w_m}{w_{ij}}\right)\right), 1 \le m \le 2L - \quad (9)$$

Unlike equation (5) and (6), in equation (8) and (9), the scaling factors q (in dB) can also be dependent on the subband index i. Only those weights for which $q_{ij}<0$ can be scaled back. A factor $\alpha \ge 1$ is introduced in equation (8) and (9), if we want to avoid full CBSR violation avoidance in the unquantized weights.

At 340, IFFT can be performed on the beam weights and taps can be output.

At 350, a test can be performed for a main beam and the main beam can be scaled, if necessary. For example, a main beam can be identified as a beam that has a largest tap (in magnitude) among a set of $N_3 \times 2L$ taps. It may so happen that the largest tap after DFT of the initial weights or unquantized beam weights may belong to the restricted beam. As mentioned in this disclosure, once it is identified that the quantized weights of the restricted beam violate the CBSR condition, then the restricted beam can be scaled down. Because of this scaling down, it can happen that the restricted beam may not remain a main beam. Hence, in this situation, all the taps of all the beams can end up being modified. Alternatively, the restricted beam can be prevented from being main beam. If it happens that the largest tap belongs to the restricted beam, then the taps of the restricted beam can be attenuated or scaled back so that all the taps of the restricted beams are less that the largest tap over the remaining beams. Since the main beam is identified using a max unquantized tap, it can be possible to identify the main beam in the unquantized weights domain and a corrective action to ensure that the restricted beam is not the main beam can be taken in the processing of block 330.

At 360, tap quantization can be performed on the taps resulting in quantized taps. At 370, DFT of the quantized taps can be performed resulting in quantized beam weights $\hat{w}_{ij}$.

At 380, the quantized taps and weights can be scaled down. This block can operate on the quantized weights. In a first step it can check whether the quantized weights are violating the CBSR constraint. If the CBSR condition is violated then the restricted beams that violated the CBSR condition can be identified. Let us first consider the case of max subband CBSR. Here, violating the CBSR can imply that there exists a j>2L−k, and a set of subbands $s_j$ such that for $i \in s_j$, $w_{ij} > g_r \max_m(w_{im})$, $1 \le m \le 2L-k$. Now calculate $$q_j = 20\log_{10}\left(\min_i\left(\max_m\left(\frac{g_r w_{im}}{w_{ij}}\right)\right)\right), 1 \le m \le 2L-k, i \in s_j. \quad (5)$$

And for the case of wideband CBSR, violation of CBSR can imply there exists j>2L−k, such that for all beams $m \le 2L-k$, $w_j \ge g_r w_m$. Now $q_j$ can be calculated as $$q_j = 20\log_{10}\left(\max_m\left(\frac{g_r w_m}{w_j}\right)\right), 1 \le m \le 2L-k. \quad (6)$$

Note that $q_j < 0$ is in dB. Since the quantization levels of the tap quantization block 360 are equally spaced in dB, it is possible to decrease the quantization levels of each of the quantized tap by equal amount in dB. If the level of the quantizers are spaced x dB, then the quantization levels of all taps of beam j can be decreased by $\text{ceil}(q_j/x)$ level. This can result in some of the quantization level going down below $0^{th}$ level or the lowest quantization level. In that case, the quantized value of that tap can be assigned to 0 value ($-\infty$ dB), can be assigned to a quantized level that maps to 0 value, or a bit map that is used for identification of zero and non-zero taps can be modified.

All the weights for the jth beam can be scaled as:

$$w_{ij} = 10^{-0.05 \times \text{ceil}\left(\frac{q_j}{x}\right)} w_{ij}, 1 \le i \le N_3 \quad (7)$$

where $N_3$ is the DFT size. Because of linearity property of DFT operation, the scaling operation of equation (7) may prevent the performance of another DFT.

The above weights can now be used for generation of precoding vector in Equation (1). There may not be a direct match between the DFT of the quantized taps and the weights now because of zeroing out of certain taps but the effect of those can be marginal as those taps can be very low.

According to a possible embodiment, the subband quantization levels of all taps/coefficients of the restricted beam can be decreased by a certain level in case it violates CBSR. Correspondingly, all the weights can be scaled by a certain dB. Also, the bitmap of corresponding to a restricted beam tap can be reset if its quantization level cannot be decreased further At least some embodiments can provide steps for ensuring CBSR on a Wideband (WB) level. For example, let the precoder be $W = W_1 W_2 W_F^H$, where $W_1$, $W_F$ can represent the SD and Frequency Dimension (FD) beams, respectively, and $W_2$ can contain the linear combination coefficients for both spatial and frequency beams. Without loss of generality, let $\overline{w}_2$ be a row in $W_2$ representing a restricted beam with M entries $\overline{w}_2^{(s)}$ where s=1, ..., M, such that $|\overline{w}_2^{(1)}| \ge |\overline{w}_2^{(2)}| \ge |\overline{w}_2^{(3)}| \ge ... \ge |\overline{w}_2^{(M)}|$. The (normalized) WB gain ($A_{WB}$) of the restricted beam can then be formulated as follows $$A_{WB} = \sqrt{\frac{1}{N_3}\sum_{j=1}^{M}|\overline{w}_2|^2} \le ... \le$$

$$\sqrt{\frac{M}{3N_3}\left(|\overline{w}_2^{(1)}|^2 + |\overline{w}_2^{(2)}|^2 + |\overline{w}_2^{(3)}|^2\right)} \le \sqrt{\frac{M}{2N_3}\left(|\overline{w}_2^{(1)}|^2 + |\overline{w}_2^{(2)}|^2\right)} \le \sqrt{\frac{M}{N_3}|\overline{w}_2^{(1)}|^2}$$

Note that $$\sqrt{(|\overline{w}_2^{(1)}|^2 + |\overline{w}_2^{(2)}|^2 + ... + |\overline{w}_2^{(s)}|^2)} \le |\overline{w}_2^{(1)}| + |\overline{w}_2^{(2)}| + ... + |\overline{w}_2^{(s)}|$$

Since all elements under the square-root are positive, thereby $$A_{WB} = \sqrt{\frac{1}{N_3}\sum_{j=1}^{M}|\overline{w}_2|^2} \le \sqrt{\frac{M}{3N_3}}\left(|\overline{w}_2^{(1)}| + |\overline{w}_2^{(2)}| + ... + |\overline{w}_2^{(M)}|\right) \le ... \le$$

$$\sqrt{\frac{M}{3N_3}}\left(|\overline{w}_2^{(1)}| + |\overline{w}_2^{(2)}| + |\overline{w}_2^{(3)}|\right) \le \sqrt{\frac{M}{2N_3}}\left(|\overline{w}_2^{(1)}| + |\overline{w}_2^{(2)}|\right) \le \sqrt{\frac{M}{N_3}}|\overline{w}_2^{(1)}|$$

Hence, tighter bounds than $$\sqrt{\frac{M}{N_3}}|\overline{w}_2^{(1)}|$$

(bound with respect to maximum tap amplitude) can be obtained for $A_{WB}$ with reasonable complexity. Hence, if the CBSR is applied to $A_{WB}$, differential amplitudes of the restricted beam can be scaled down with a fixed scaling factor (in a manner similar to the embodiment above where there is no need for restriction), whenever $A_{WB}$ violates CBSR.

Note that can be one condition for the equations to hold true, where there should be as at least as many non-zero taps in the restricted beams as the coefficients in the sum bound. For example, if the bound $$\sqrt{\frac{M}{3N_3}}\left(|\overline{w}_2^{(1)}| + |\overline{w}_2^{(2)}| + |\overline{w}_2^{(3)}|\right)$$

is used, then there should be at least three non-zero coefficients in $\overline{w}_2$.

According to a possible embodiment, CBSR can be handled in WB mode as well as maximum subband mode. Besides being similar to Rel.15 CBSR approach, the WB approach described above can decrease the chances of detecting CBSR violation and hence can enable UE to provide an optimum feedback without violating CBSR more often. Thus, a WB approach can be used for CBSR.

Typically, a strongest coefficient indicator can identify a strongest coefficient among a set of M×2L coefficients. The strongest coefficient whose value is normalized to one can be reported by this strongest coefficient indicator. It can happen that the strongest coefficient after DFT of the initial weights (or unquantized beam weights) can result in the strongest coefficient belonging to the restricted beam. As discussed above, once it is identified that the quantized weights of the restricted beam violate the CBSR condition, then the restricted beam can be scaled down. Because of this scaling down, it can happen that the restricted beam may no longer have the strongest coefficients or tap. Hence, in this situation, all the taps of all the beams may end up being modified. Alternatively, the restricted beam can be prevented from being main beam. For example, the strongest tap may not belong to the restricted beam. If it so happens that the strongest coefficient belongs to the restricted beam, then the taps of the restricted beam can be attenuated or scaled back so that all the taps of the restricted beams are less that the largest tap over the remaining beams.

According to a possible embodiment, in some cases having the restricted beam as the beam having the strongest coefficient may make it difficult to scale down the coefficient when needed. Thus, the strongest coefficient may not belong to the restricted beam.

According to a possible embodiment, a method can be performed in a wireless communication device. The method can include receiving a CBSR configuration from a TRP where the CBSR configuration cam include a set of restricted beams and each restricted beam can be associated with a restricted gain coefficient. The method can include receiving reference signals transmitted by the TRP. The method can include determining sets of compressed precoder coefficients based on at least the received reference signals and the CBSR configuration, where each set can correspond to a beam. Each beam's set of coefficients can correspond to a precoder gain. The precoder gain of a restricted beam can satisfy a constraint based on at least the set of restricted beam's coefficients. The method can include transmitting a CSI report to the TRP, the CSI report comprising the sets of precoding coefficients.

According to a possible embodiment a method can be performed in a wireless communication device. The method can include receiving a CBSR configuration from a TRP, where the CBSR configuration can include a set of restricted beams and each restricted beam can be associated with a restricted beam gain coefficient. The method can include receiving reference signals transmitted by the TRP. The method can include determining sets of compressed precoder coefficients based on at least the received reference signals and the CBSR configuration. Each set of compressed precoder coefficients can correspond to a beam. Each beam's set of compressed precoder coefficients can correspond to a set of precoder gains at a set of frequencies, where the beam's precoder gain at a frequency within the set of frequencies can be based on at least the Fourier transform of the beam's set of precoding coefficients. The precoder gains of a restricted beam can satisfy a constraint based on at least the set of restricted beam coefficients. The method can include transmitting a CSI report to the TRP, where the CSI report can include the sets of precoding coefficients.

According to a possible implementation of the above embodiment, a beam's precoder gain corresponding to the beam's set of coefficients can be proportional to the sum of the magnitude square of the beam's set of coefficients. According to a possible implementation of the above embodiment, a beam's precoder gain corresponding to the beam's set of coefficients can be proportional to the ordered partial sum of magnitudes of the set of coefficients. According to a possible implementation of the above embodiment, the constraint can be a restricted beam's precoder gain being less than or equal to the product of the restricted beam's restricted gain coefficient and a reference beam's precoder gain.

According to a possible embodiment a method can be performed in a wireless communication device. The method can include receiving a CBSR configuration from TRP where the CBSR configuration can include a set of restricted beams with each restricted beam associated with a restricted beam gain coefficient. The method can include receiving reference signals transmitted by the TRP. The method can include determining sets of compressed precoder coefficients based on at least the received reference signals and the CBSR configuration where each set can correspond to a beam. Each beam's set of compressed precoder coefficients can correspond to a set of precoder gains at a set of frequencies, where the beam's precoder gain at a frequency within the set of frequencies can be based on at least the Fourier transform of the beam's set of precoding coefficients. The precoder gains of a restricted beam can satisfy a constraint based on at least the set of restricted beam coefficients. The method can include transmitting a CSI report to the TRP, where the CSI report can include the sets of precoding coefficients.

According to a possible implementation of the above embodiment, the constraint can be a requirement that a restricted beam's precoding gain at a frequency is less than or equal to the product of the restricted beam's precoder gain and a reference beam's precoder gain at the same frequency for all frequencies within a set of constraint frequencies. According to a possible implementation of the above embodiment, the constraint can be the requirement that the maximum of the restricted beam's precoder gain over a set constraint frequencies is less than or equal to the product of the restricted beam's associated gain and the maximum of a reference beam's precoder gain over the set of constraint frequencies.

According to a possible embodiment a method can be performed in a UE. The method can be for communicating with a TRP over a radio access network using spatial multiplexing, where multiple transmission layers are transmitted at a time and each transmission layer can include multiple beams. The method can include receiving a CBSR configuration from the TRP where the CBSR configuration can include a set of restricted beams and a set of associated restricted gains. The method can include identifying a main beam in the multiple beams. The method can include ensuring that the main beam does not belong to the set of restricted beams. The method can include generates an initial set of beam weights based on an estimate of the channel and the multiple beams. The method can include generating a set of taps by transforming an initial set of taps from frequency domain to time domain. The method can include quantizing the set of taps to generate a quantized set of taps. The method can include generating a set of quantized weights by transforming quantized set of taps from time domain to frequency domain. The method can include obtaining a violating set of at least one of the quantized taps and the quantized weights of restricted beams that violates a CBSR condition, where the CBSR condition can be based on the associated restricted gain. The method can include transmitting a CSI report based on the violating set.

According to a possible implementation of the above embodiment, ensuring the main beam does not belong to the set of restricted beams can further involve modifying the taps of the restricted beams.

According to a possible implementation of the above embodiment, the method can include scaling a plurality of taps associated with the restricted beam belonging to the violating set.

According to a possible implementation of the above embodiment, the method can include scaling a plurality of weights associated with the restricted beam belonging to the violating set.

According to a possible implementation of the above embodiment, obtaining the violating set can be based on the weights of the restricted beams and the weight of the remaining beams in the multiple beams. According to a possible example of this implementation, obtaining the violating set can be based on a comparison between weights of restricted beam and the remaining beams. According to a possible example of this implementation, obtaining the violating set can use a max sub-band approach. According to a possible example of this implementation, obtaining the violating set can use a wideband approach.

According to a possible implementation of the above embodiment, obtaining the violating set can involve obtaining a sum of magnitudes of a subset of weights of the restricted beam.

According to a possible implementation of the above embodiment, obtaining the violating set can involve obtaining a sum of magnitudes of a subset of taps of the restricted beam. According to a possible example of this implementation, the subset can include a plurality taps with larger magnitudes. According to a possible example of this implementation, the subset can include a plurality weights with larger magnitudes.

Figure 4:
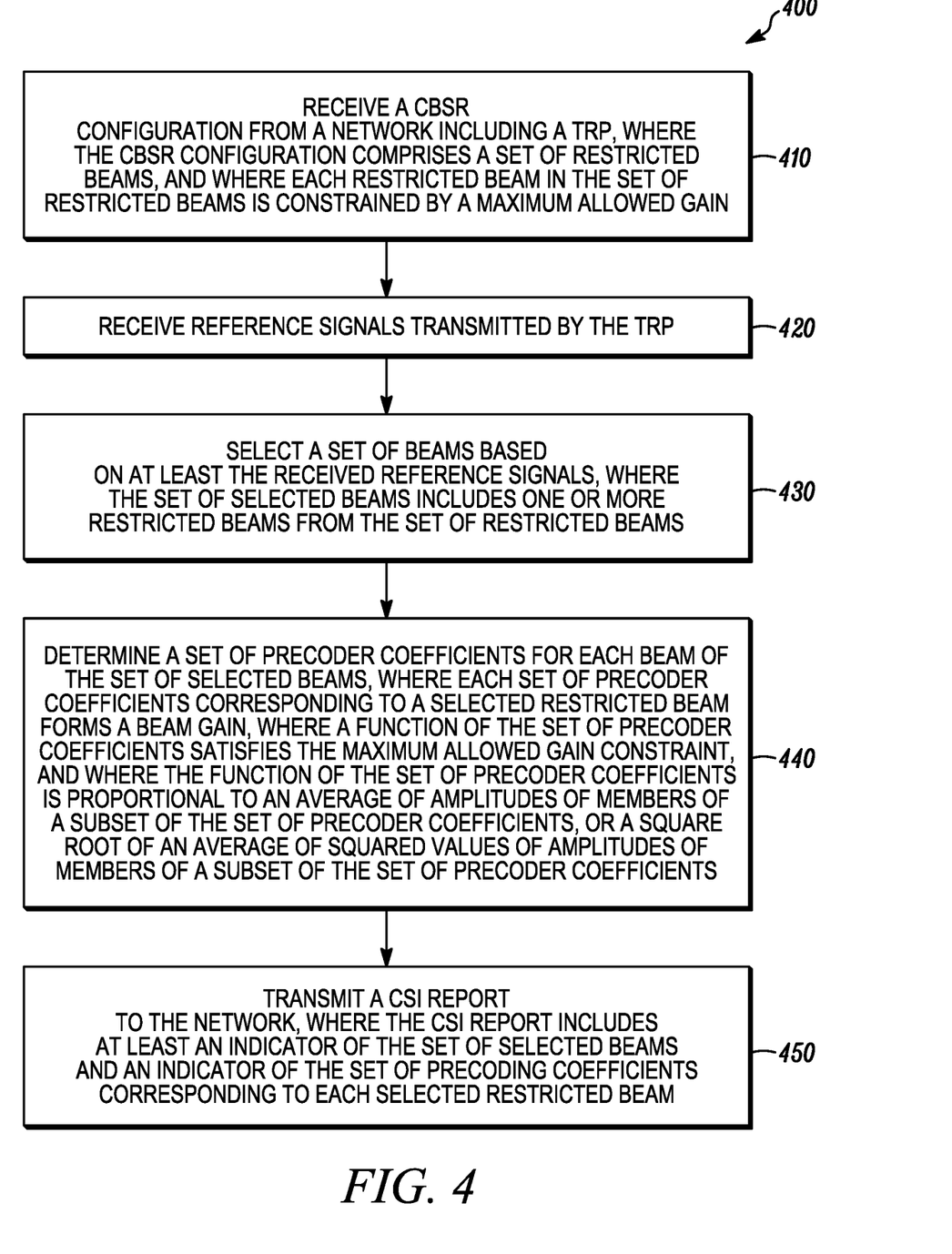
FIG. 4 is an example flowchart illustrating the operation of a wireless communication device according to a possible embodiment.

FIG. 4 is an example flowchart 400 illustrating the operation of a wireless communication device, such as the UE 110, according to a possible embodiment. At 410, a CBSR configuration can be received from a network. The network can include a TRP. The CBSR configuration can comprise a set of restricted beams. Each restricted beam in the set of restricted beams can be constrained by a maximum allowed gain. Maximum allowed gain can be a value reported by the network for each restricted beam.

At 420, reference signals transmitted by the TRP can be received. At 430, a set of beams can be selected based on at least the received reference signals. The set of selected beams can include one or more restricted beams from the set of restricted beams.

At 440, a set of precoder coefficients can be determined for each beam of the set of selected beams. Each set of precoder coefficients corresponding to a selected restricted beam can form a beam gain. A function of the set of precoder coefficients can satisfy the maximum allowed gain constraint. The function of the set of precoder coefficients can be proportional to one selected from an average of amplitudes of members of a subset of the set of precoder coefficients and a square root of an average of squared values of amplitudes of members of the subset of the set of precoder coefficients. The phrase "one selected from" means one or the other. Thus, "one selected from two elements" means either the first element or the second element of the two elements. Thus, the function of the set of precoder coefficients can be proportional to an average of amplitudes of members of the subset of the set of precoder coefficients or a square root of an average of squared values of amplitudes of members of the subset of the set of precoder coefficients.

According to a possible embodiment, the function can be $$\sqrt{\frac{M}{2N_3}\left(|\overline{w}_2^{(1)}|^2 + |\overline{w}_2^{(2)}|^2\right)},$$

$$\sqrt{\frac{M}{3N_3}\left(|\overline{w}_2^{(1)}|^2 + |\overline{w}_2^{(2)}|^2 + |\overline{w}_2^{(3)}|^2\right)},$$

$$\sqrt{\frac{1}{N_3}\sum_{j=1}^{M}|\overline{w}_2|^2},$$

$$\sqrt{\frac{M}{3N_3}}\left(|\overline{w}_2^{(1)}| + |\overline{w}_2^{(2)}| + \ldots + |\overline{w}_2^{(M)}|\right),$$

$$\sqrt{\frac{M}{3N_3}}\left(|\overline{w}_2^{(1)}| + |\overline{w}_2^{(2)}| + |\overline{w}_2^{(3)}|\right),$$

$$\sqrt{\frac{M}{2N_3}}\left(|\overline{w}_2^{(1)}| + |\overline{w}_2^{(2)}|\right),$$

$$\sqrt{\frac{M}{N_3}}|\overline{w}_2^{(1)}|,$$

and/or other functions of precoder coefficients. The variable $\overline{w}_2^{(s)}$ can represent the precoder coefficient. To elaborate, the variable $w_2^{(s)}$ can be the coefficient with the $s^{th}$ largest amplitude value. For example, these coefficients can be indexed with respect to the descending order of their amplitude values.

At 450, a CSI report can be transmitted to the network. The CSI report can include at least an indicator of the set of selected beams and an indicator of the set of precoding coefficients corresponding to each selected restricted beam. The CSI report can also include coefficients of the selected beams, whether they are restricted or not.

According to a possible embodiment, the function of the set of precoder coefficients can be proportional to an average of amplitude values of members of the subset of the set of precoder coefficients. According to a possible embodiment, the subset of the set of precoder coefficients can include all coefficients with non-zero amplitude values. According to a possible embodiment, the subset of the set of precoder coefficients corresponding to the beam can be the beam's set of coefficients in descending order of their amplitude values.

According to a possible embodiment, the subset of coefficients can be based on descending order. The size of the subset of the coefficients can be tied to the number of non-zero coefficients. For example, one condition for the equations to hold true can be that there should be as at least as many non-zero taps in the restricted beams as the coefficients in the sum bound. For example, if the bound $$\sqrt{\frac{M}{3N_3}} \left( |\overline{w}_2^{(1)}| + |\overline{w}_2^{(2)}| + |\overline{w}_2^{(3)}| \right)$$

is used, then there should be at least three non-zero coefficients in $\overline{w}_2$.

According to a possible embodiment, the function of the set of precoder coefficients can be proportional to a square root of an average of squared amplitude values of members of subset of the set of precoder coefficients. According to a possible embodiment, the subset of the set of precoder coefficients includes all coefficients with non-zero amplitude values. According to a possible embodiment, the subset of the set of precoder coefficients corresponding to the beam can be the beam's set of coefficients in descending order of their amplitude values.

Figure 5:
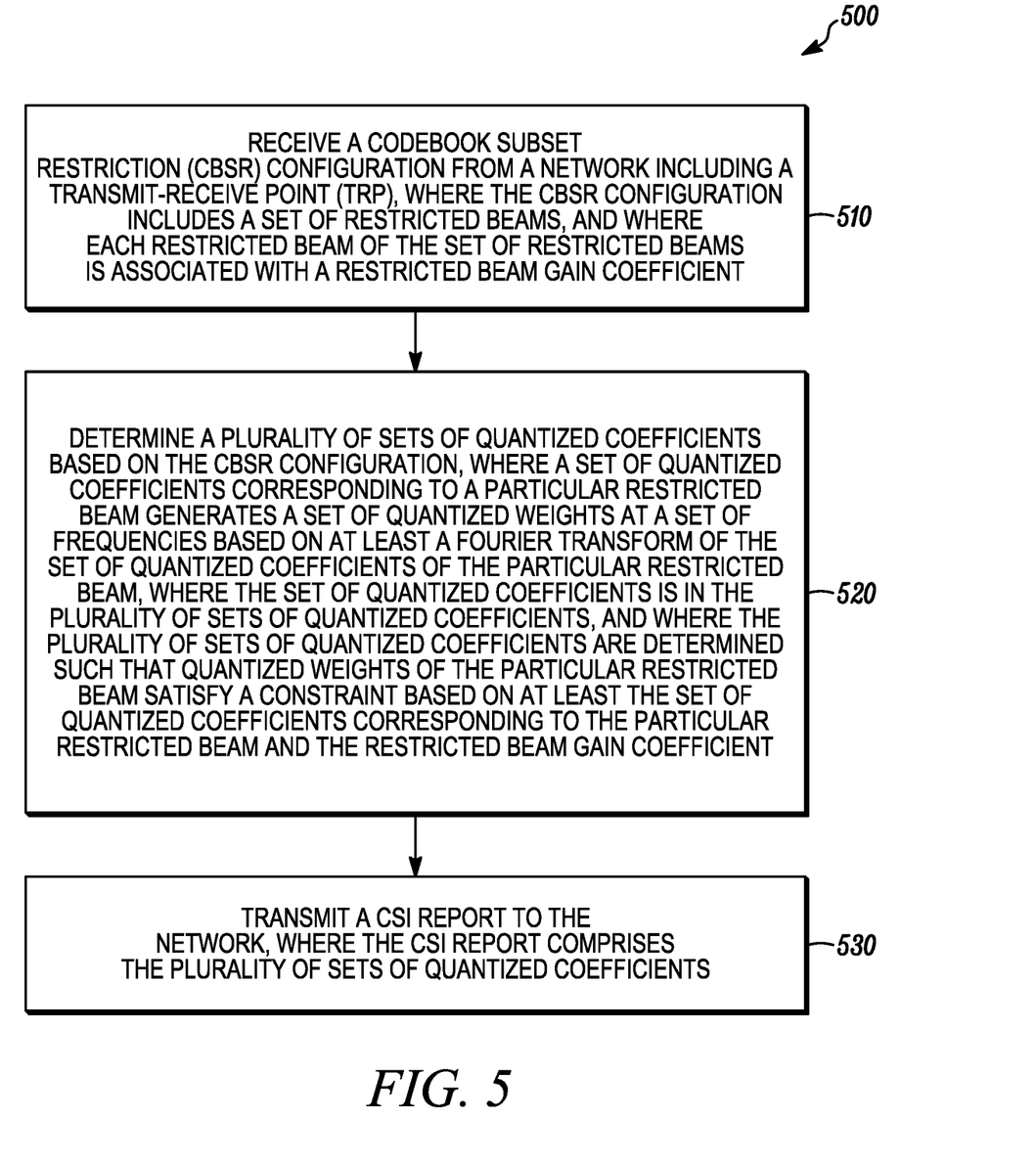
FIG. 5 is an example flowchart illustrating the operation of a wireless communication device according to a possible embodiment.

FIG. 5 is an example flowchart 500 illustrating the operation of a wireless communication device, such as the UE 110, according to a possible embodiment. At 510, a CBSR configuration can be received from a network including a TRP. The CBSR configuration can include a set of restricted beams. Each restricted beam of the set of restricted beams can be associated with a restricted beam gain coefficient.

At 520, a plurality of sets of quantized coefficients can be determined based on the CBSR configuration. A set of quantized coefficients corresponding to a particular restricted beam can generate a set of quantized weights at a set of frequencies based on a least a Fourier transform of the set of quantized coefficients of the particular restricted beam. The set of quantized coefficients can be in the plurality of sets of quantized coefficients. The plurality of sets of quantized coefficients can be determined such that quantized weights of the particular restricted beam satisfy a constraint based on at least the set of quantized coefficients corresponding to the particular restricted beam and the restricted beam gain coefficient.

For example, quantized weights of the particular restricted beam can satisfy a constraint based on at least the set of quantized coefficients corresponding to the particular restricted beam and the restricted beam gain coefficient.

At 530, a CSI report can be transmitted to the network. The CSI report can comprise the plurality of sets of quantized coefficients.

According to a possible embodiment, determining a plurality of sets of quantized coefficients can include receiving a beam, can include generating a set of coefficients by transforming a set of beam weights from a frequency domain to a time domain, where the beam weights correspond to the received beam, and can include quantizing the generated set of coefficients to determine the plurality of sets of quantized coefficients.

According to a possible embodiment, a violating set of at least one of quantized weights of a restricted beam of the restricted beams can be obtained. The violating set can violate a CBSR condition. The CBSR condition can be based on an associated restricted gain of the CBSR configuration. The CSI report can be based on the violating set of at least one of the quantized weights.

According to a possible embodiment, reference signals can be received from the TRP and the plurality of sets of compressed precoder coefficients can be determined based on the received reference signals and the CBSR configuration. For example, according to a possible embodiment, the CBSR condition is based on an associated restricted gain of the CBSR configuration.

According to a possible embodiment, multiple transmission layers can be transmitted at a time to the TRP over the network using spatial multiplexing. Each transmission layer of the multiple transmission layers can include multiple beams. The violating set can be generated for each layer.

According to a possible embodiment, the constraint can be a requirement that a given quantized weight of a given restricted beam at a given frequency is less than or equal to a product of an associated gain of the given restricted beam and a reference quantized weight of a reference beam at the same frequency for all frequencies within a set of constraint frequencies.

According to a possible embodiment, the constraint can be a requirement that a maximum of a quantized weight of a given restricted beam over a set constraint frequencies is less than or equal to a product of an associated gain of the restricted beam and the maximum of a quantized weight of a reference beam over the set of constraint frequencies.

According to a possible embodiment, multiple transmission layers can be transmitted at a time to the TRP over the network using spatial multiplexing. Each transmission layer of the multiple transmission layers can include multiple beams. The CBSR configuration can include a set of at least one restricted beam of the multiple beams.

According to a possible embodiment, the quantized coefficients of the restricted beams can be modified. The transmitted CSI report can include the modified quantized coefficients. According to a possible implementation, the quantized coefficients can be modified by scaling down the quantized coefficients.

According to a possible embodiment, a main beam that does not belong to the set of restricted beams can be identified. The transmitted CSI report can include an index corresponding to the main beam.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
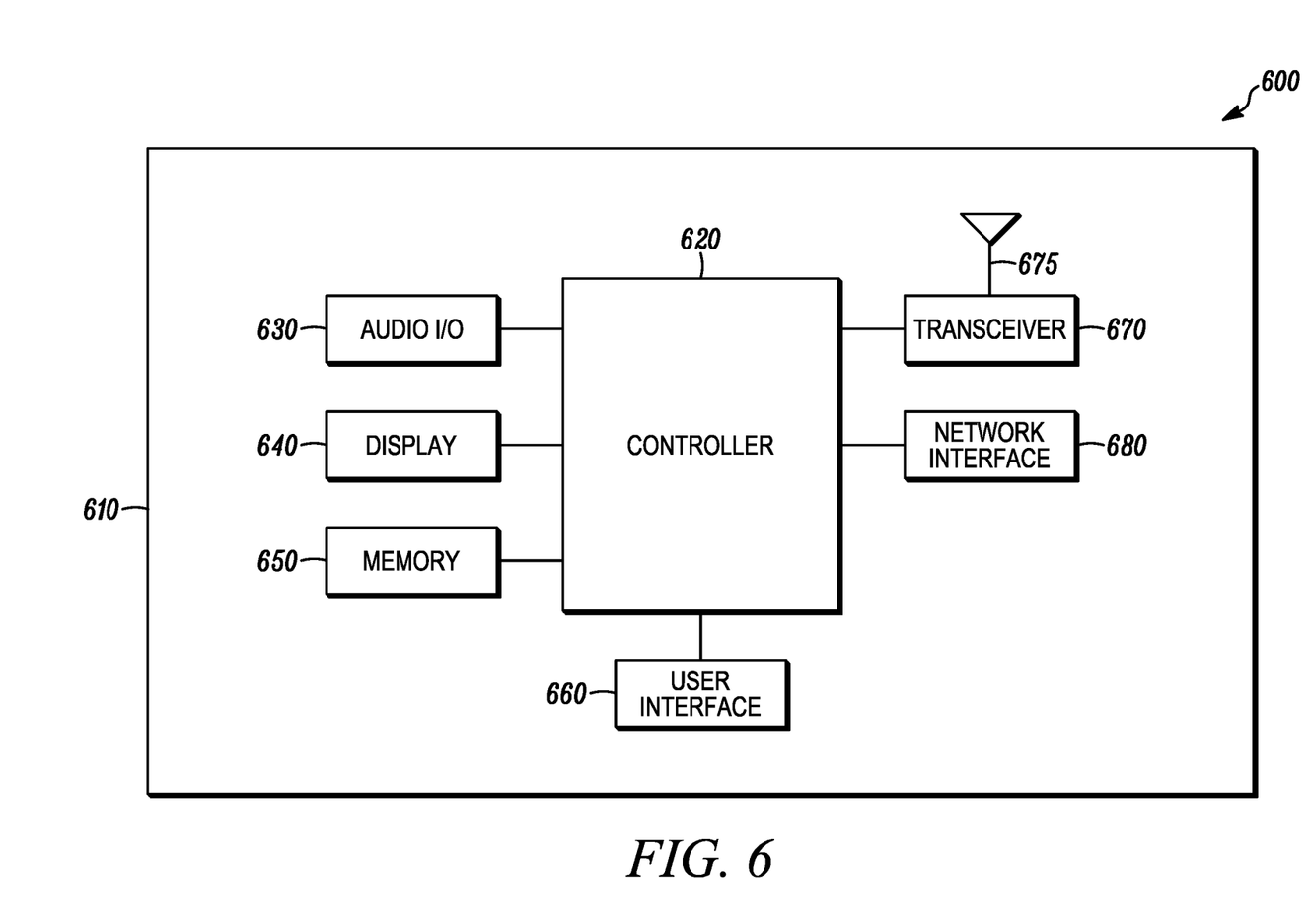
FIG. 6 is an example block diagram of an apparatus according to a possible embodiment.

FIG. 6 is an example block diagram of an apparatus 600, such as the UE 110, the network entity 120, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller 620, a user interface 660 coupled to the controller 620, a transceiver 670 coupled to the controller 620, at least one antenna 675 coupled to the transceiver 670, and a network interface 680 coupled to the controller 620. The apparatus 600 may not necessarily include all of the illustrated elements for different embodiments of the present disclosure. The apparatus 600 can perform the methods described in all the embodiments.

The display 640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 670 can be one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 650 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 600 or the controller 620 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 650, elsewhere on the apparatus 600, in cloud storage, and/or anywhere else that can store software and/or an operating system. The apparatus 600 or the controller 620 may also use hardware to implement disclosed operations. For example, the controller 620 may be any programmable processor. Furthermore, the controller 620 may perform some or all of the disclosed operations. For example, at least some operations can be performed using cloud computing and the controller 620 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation, the apparatus 600 can perform the methods and operations of the disclosed embodiments. The transceiver 670 can transmit and receive signals, including data signals and control signals that can include respective data and control information. The controller 620 can generate and process the transmitted and received signals and information.

According to a possible embodiment, the transceiver 670 can receive a CBSR configuration from a network. The network can include a TRP. The CBSR configuration can include a set of restricted beams. Each restricted beam in the set of restricted beams can be constrained by a maximum allowed gain. The transceiver 670 can receive reference signals transmitted by the TRP.

The controller 620 can select a set of beams based on at least the received reference signals. The set of selected beams can include one or more restricted beams from the set of restricted beams.

The controller 620 can determine a set of precoder coefficients for each beam of the set of selected beams. Each set of precoder coefficients corresponding to a selected restricted beam can form a beam gain. A function of the set of precoder coefficients can satisfy the maximum allowed gain constraint. The function of the set of precoder coefficients can be proportional to an average of amplitudes of members of a subset of the set of precoder coefficients, or a square root of an average of squared values of amplitudes of members of the subset of the set of precoder coefficients.

The transceiver 670 can transmit a CSI report to the network. The CSI report can include at least an indicator of the set of selected beams and an indicator of the set of precoding coefficients corresponding to each selected restricted beam.

According to a possible embodiment, the function of the set of precoder coefficients can be proportional to an average of amplitude values of members of the subset of the set of precoder coefficients. According to a possible embodiment, the subset of the set of precoder coefficients can include all coefficients with non-zero amplitude values. According to a possible embodiment, the subset of the set of precoder coefficients corresponding to the beam can be the beam's set of coefficients in descending order of their amplitude values.

According to a possible embodiment, the function of the set of precoder coefficients can be proportional to a square root of an average of squared amplitude values of members of subset of the set of precoder coefficients. According to a possible embodiment, the subset of the set of precoder coefficients can include all coefficients with non-zero amplitude values. According to a possible embodiment, the subset of the set of precoder coefficients corresponding to the beam can be the beam's set of coefficients in descending order of their amplitude values.

According to a possible embodiment, the transceiver 670 can receive a CBSR configuration from a network including a TRP. The CBSR configuration can include a set of restricted beams. Each restricted beam of the set of restricted beams can be associated with a restricted beam gain coefficient.

The controller 620 can determine a plurality of sets of quantized coefficients based on the CBSR configuration. A set of quantized coefficients corresponding to a particular restricted beam can generate a set of quantized weights at a set of frequencies based on a least a Fourier transform of the set of quantized coefficients of the particular restricted beam. The set of quantized coefficients can be in the plurality of sets of quantized coefficients. The plurality of sets of quantized coefficients can be determined such that quantized weights of the particular restricted beam satisfy a constraint based on at least the set of quantized coefficients corresponding to the particular restricted beam and the restricted beam gain coefficient.

The transceiver 670 can transmit a CSI report to the network. The CSI report can include the plurality of sets of quantized coefficients.

According to a possible embodiment, the controller 620 can determine a plurality of sets of quantized coefficients by receiving a beam, by generating a set of coefficients by transforming a set of beam weights from a frequency domain to a time domain, where the beam weights correspond to the received beam, and by quantizing the generated set of coefficients to determine the plurality of sets of quantized coefficients.

According to a possible embodiment, the controller 620 can obtain a violating set of at least one of quantized weights of a restricted beam of the restricted beams. The violating set can violate a CBSR condition. The CBSR condition can be based on an associated restricted gain of the CBSR configuration. The CSI report can be based on the violating set of at least one of the quantized weights.

According to a possible embodiment, the transceiver 670 can transmit multiple transmission layers at a time to a TRP over the network using spatial multiplexing. Each transmission layer of the multiple transmission layers can include multiple beams. The violating set can be generated for each layer.

According to a possible embodiment, the constraint can include a requirement that a given quantized weight of a given restricted beam at a given frequency is less than or equal to a product of an associated gain of the given restricted beam and a reference quantized weight of a reference beam at the same frequency for all frequencies within a set of constraint frequencies.

According to a possible embodiment, the constraint can be a requirement that a maximum of a quantized weight of a given restricted beam over a set constraint frequencies is less than or equal to a product of an associated gain of the restricted beam and the maximum of a quantized weight of a reference beam over the set of constraint frequencies.

According to a possible embodiment, the transceiver 670 can transmit multiple transmission layers at a time to the TRP over the network using spatial multiplexing. Each transmission layer of the multiple transmission layers can include multiple beams. The CBSR configuration can include a set of at least one restricted beam of the multiple beams.

According to a possible embodiment, the controller 620 can modify the quantized coefficients of the restricted beams. The transmitted CSI report can include the modified quantized coefficients.

According to a possible embodiment, the controller 620 can identify a main beam that does not belong to the set of restricted beams. The transmitted CSI report can include an index corresponding to the main beam.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A method in a wireless communication device, the method comprising:
   receiving a codebook subset restriction configuration from a network including a transmit-receive point,
      wherein the codebook subset restriction configuration comprises a set of restricted beams, and
      wherein each restricted beam in the set of restricted beams is constrained by a configured maximum allowed gain value from a set of maximum allowed gain values;
   selecting a set of beams, where the set of selected beams includes at least one restricted beam;
   determining a set of precoder coefficients for each beam of the set of selected beams,
      wherein a function of the set of precoder coefficients corresponding to the at least one restricted beam does not exceed the configured maximum allowed gain value, and
      wherein the function of the set of precoder coefficients is proportional to a square root of an average of squared values of amplitudes of members of a subset of the set of precoder coefficients; and
   transmitting a channel state information report to the network, where the channel state information report includes at least an indicator of the set of selected beams and an indicator of the set of precoder coefficients corresponding to each selected beam.

2. The method according to claim 1, wherein the subset of the set of precoder coefficients includes all coefficients with non-zero amplitude values.

3. The method according to claim 1, wherein the subset of the set of precoder coefficients corresponding to each selected beam is the respective beam's set of coefficients in descending order of their amplitude values.

4. A wireless communication device comprising:
a transceiver that receives a codebook subset restriction configuration from a network including a transmit-receive point,
wherein the codebook subset restriction configuration comprises a set of restricted beams, and
wherein each restricted beam in the set of restricted beams is constrained by a configured maximum allowed gain value from a set of maximum allowed gain values; and
a controller coupled to the transceiver, where the controller
selects a set of beams, where the set of selected beams includes at least one restricted beam, and
determines a set of precoder coefficients for each beam of the set of selected beams,
wherein a function of the set of precoder coefficients corresponding to the at least one restricted beam does not exceed the configured maximum allowed gain value, and
wherein the function of the set of precoder coefficients is proportional to a square root of an average of squared values of amplitudes of members of a subset of the set of precoder coefficients,
wherein the transceiver transmits a channel state information report to the network, where the channel state information report includes at least an indicator of the set of selected beams and an indicator of the set of precoder coefficients corresponding to each selected beam.

5. The wireless communication device according to claim 4, wherein the subset of the set of precoder coefficients includes all coefficients with non-zero amplitude values.

6. The wireless communication device according to claim 4, wherein the subset of the set of precoder coefficients corresponding to each selected beam is the respective beam's set of coefficients in descending order of their amplitude values.

7. A network entity comprising:
a controller that controls operations of the network entity; and
a transceiver coupled to the controller, where the transceiver
transmits a codebook subset restriction configuration,
wherein the codebook subset restriction configuration comprises a set of restricted beams, and
wherein each restricted beam in the set of restricted beams is constrained by a configured maximum allowed gain value from a set of maximum allowed gain values, and
receives a channel state information report, where the channel state information report includes at least an indicator of a set of selected beams and an indicator of set of precoding coefficients corresponding to each selected beam,
wherein the set of precoding coefficients are determined for each beam of the set of selected beams, where the set of beams includes at least one restricted beam,
wherein a function of the set of precoder coefficients corresponding to the at least one restricted beam does not exceed the configured maximum allowed gain value, and
wherein the function of the set of precoder coefficients is proportional to a square root of an average of squared values of amplitudes of members of a subset of the set of precoder coefficients.

8. The network entity according to claim 7, wherein the subset of the set of precoder coefficients includes all coefficients with non-zero amplitude values.

9. The network entity according to claim 7, wherein the subset of the set of precoder coefficients corresponding to each selected beam is the respective beam's set of coefficients in descending order of their amplitude values.

* * * * *